Oct. 12, 1937.   F. SEMMLER ET AL   2,095,838
APPARATUS FOR MANIFOLD BOOKKEEPING
Filed Jan. 18, 1935   2 Sheets-Sheet 2

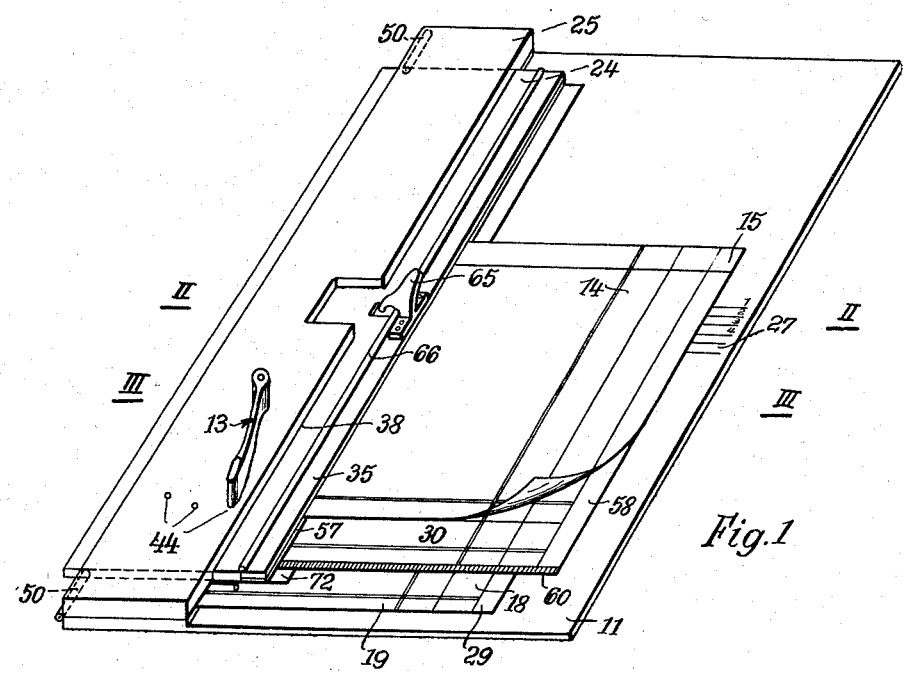

INVENTORS
FRIDOLIN SEMMLER
HANS FISHER
BY Brant Brooks
ATTYS.

Patented Oct. 12, 1937

2,095,838

UNITED STATES PATENT OFFICE 2,095,838

APPARATUS FOR MANIFOLD BOOKKEEPING

Fridolin Semmler and Hans Fischer, Gottingen, Germany

Application January 18, 1935, Serial No. 2,428
In Germany January 19, 1934

7 Claims. (Cl. 282—29)

This invention relates to an apparatus for manifold bookkeeping on loose sheets, particularly for those kinds of manifolding methods which are known as the "one-entry" method or the "once-booking" method and in which debit and credit accounts are kept in debit and credit columns simultaneously under a single text and statement of amounts.

The appliances at present known for manifolding methods of this kind are considerably defective in practical use. Thus, for example, the use of studs and holes for the attachment of the account sheets is complicated, constitutes a source of error and easily leads to damage to the account sheets. Other arrangements require that a certain account sheet shall always lie on the top or necessitate an unusual arrangement of the debit and credit columns. Many arrangements make the use of account sheets with two different columns for the text indispensable.

In improving arrangements of this kind it is an object of the present invention to provide a manifold bookkeeping method of specially practical construction and manipulation.

According to this invention an arrangement is used for this purpose in which facsimile or duplicate blank account sheets can arbitrarily be moved to the left and right respectively by means of a feeder until amount columns of unlike designations overlap each other (debit to credit and vice versa).

The construction of the manifold bookkeeping appliance is very greatly simplified in an arrangement of this kind. Complicated and expensive elements or those which wear out readily can be avoided. The number of constructional parts is small.

A rock lever swinging relatively to the base plate of the manifold bookkeeping apparatus may be used as the feeder and may be adapted to engage with a table, slab, frame, or the like, carrying some holding device, such as a clamping bar, for example, for the upper sheet or sheets, and which table in its turn runs in a guide provided on the base plate.

All the account sheets, irrespective of whether they be for personal or goods accounts bear the same inscription and are first written up to the amount columns while lying in the original position with like columns over each other. After that the feeder is operated, which operation may with advantage take place in the same direction as the desired movement of the top account sheet and, therefore, not only assists the work in a correct psychological aspect, but at the same time enables an effective check on the proper and correct shifting of the account forms. Then, after the operation of the feeder, the filling in of the top debit and credit columns with simultaneous counter entries on the lower account can be proceeded with.

In addition to the extremely simple and convenient mode of manipulation of the apparatus according to this invention and consequently of the manifolded entries there is also the special advantage that every wrong entry shows itself up automatically, in that it appears in an unusual place on the lower account sheet, e. g. outside the printed matter on the margin or superimposed on the other text, thus being made manifest at once.

The arrangement according to the invention affords at the same time the advantageous possibility of keeping conjointly with the personal and goods accounts a collective account which permits the daily balance to be simply and quickly ascertained.

This is achieved by using an account sheet which receives the entries of the personal accounts and may be shifted together with the particular person's account sheet to be written up, but which is held, e. g. clamped, independently of the personal account sheet, so that the latter can be interchanged separately as may be desired.

For this purpose there is mounted on the table or plate which carries the device for holding the upper sheet a further means of attachment, for example a second clamping bar. The unlocking of the devices for the upper and middle sheets is with advantage produced by a single operating member in a common operation, for example, by the help of tappet devices, but suitably in stages.

The invention will be further described with reference to the drawings wherein

Fig. 1 is a perspective of an apparatus made according to the invention;

Fig. 2 is a section taken substantially along the line II—II of Fig. 1;

Figure 3:
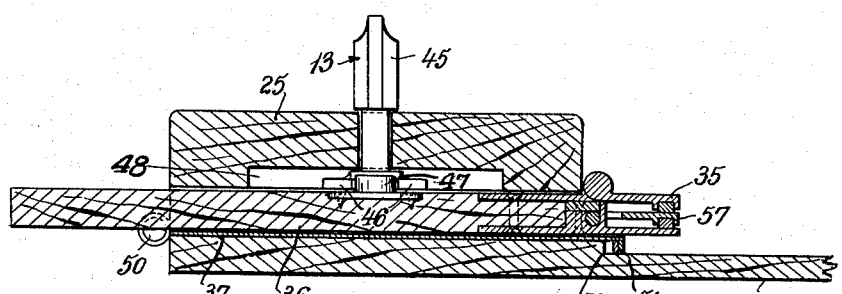
Fig. 3 is a section taken substantially along the line III—III of Fig. 1.

11 denotes a writing or base plate which acts in the usual way as a support for the sheets to be written upon. According to the invention a feeder 13 movable relatively to this plate is provided. By means of this feeder superposed account sheets bearing the same inscriptions can be moved to the left or right as may be desired in such a way that unlike amount columns are superposed, that is to say, debit over credit and vice versa. In the example shown in the drawings the debit column 14 of the sheet 15 has been moved to the right over the credit column 18 of the goods account sheet 19.

The feeder 13 in the form of a rock lever acts on the device 24 which holds the upper sheet 15, and which is mounted to slide in a guide 25 on the base plate 11.

Supposing now the personal account to be on top, and the goods account underneath, the forms 15, 19 which bear the same inscription, are laid with the same columns exactly over each other. A scale 27 on the plate 11 serves to get the lines into exact register with each other. In this position the sheets, when the credit method is used, are filled in up to the column 14. Then, the sheet holding device 24 and, therefore, the sheet 15 is moved to the right by means of the feeder 13 and to an exactly limited amount which corresponds to the overlapping of the columns 14, 18. The entry in the debit column on sheet 15 then is duplicated on sheet 19 in the credit column. As the example illustrated in the drawings shows, the feeder 13 and the sheet 15 are moved in this case in the same direction, so as to provide working conditions which are psychologically favourable.

In the method carried out by the apparatus according to this invention, it follows that when both sheets are correctly shifted, but the amount is entered in the wrong column on the sheet 15, and also when the booking is correct but the sheet 19 has been wrongly shifted, the manifold on sheet 19 appears at an improper place which is at once obvious, for example, on the margin 29, and therefore provides a reliable, automatic means of checking.

Any desired kind of device such as a clamping bar 35, for example, may be used as a means of holding the upper sheet. This bar 35 (see Fig. 2) may, with advantage, be affixed to a table, a frame or a plate 36, or the like, which in the illustrated example runs in the recess or opening 38, or the like, which is formed in the member 25 and is closed at the bottom by a plate 37, for example.

Figure 4:
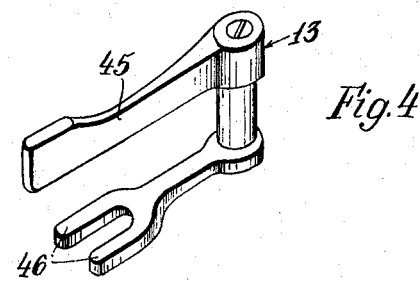
Fig. 4 is a perspective, on a larger scale, of a feeder embodied in the structure shown in Fig. 1.

The feeder 13 for shifting the table 36 may, as shown in Figs. 3 and 4, include a rock lever arm 45. This feeder is pivotally mounted in the member 25 and engages with a suitable co-operating member, such as a pin 47 on the table 36 by suitable means, such as a slotted arm of a slotted link, a fork, a loop, or the like, formed as a part of the feeder. The slotted arm 46 might obviously be also mounted on the table 36 and the pin 47 on the lever 45. The rocking of the lever 45 produces the shifting of the table 36 and the elements connected therewith.

Figure 6:
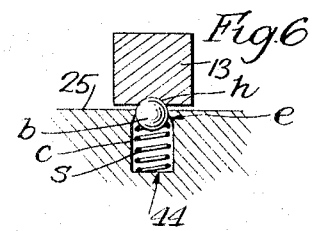
Fig. 6 is a vertical section showing on a larger scale an example of a yieldable lock or stop.

As shown in Fig. 1 at 44, the sheet holding device or the rock lever 13 or both may, with advantage, be locked in the left-hand, middle and right-hand positions by spring elements, stops or the like indicating these stages or positions. The distance corresponding to the necessary shifting of the account sheet may also be regulated by limiting the swing of the rock lever in the space 48 provided for the movement of the fork 46. A convenient form of yieldable stop or resilient locking means 44 is shown in Fig. 6, wherein a projecting member $b$ is mounted in a recess $c$ formed in the upper portion of the guide member 25 and an inwardly extending flange $e$ prevents outward displacement of the member $b$ from the recess but permits it to project above the surface of the member 25. A spring $s$ resting on the bottom of the recess $c$ urges the member $b$ to its projecting position and yieldably resists movement of such member inwardly of the recess. The rock lever arm 45 of the feeder 13 is formed with a recess $h$ and is adapted to receive the projecting portion of the member $b$ therein. Thus it will be apparent that by swinging the lever arm 45 to the left or right over any of the stops 44 the member $b$ will snap into the recess $h$ and yieldably stop or lock the lever arm in accordance with the strength of the spring $c$ and the resistance offered thereby.

Figure 5:
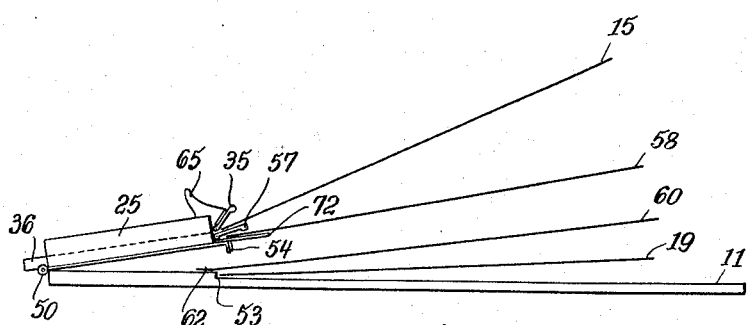
Fig. 5 is a diagrammatic elevation of the apparatus showing therein the operative position of the account sheets.

Figs. 1 and 3 show joints or hinges 50, which enable the guide member 25 of the base plate 11 to be raised as is diagrammatically shown in Fig. 5. This raising of the guide member 25 serves for conveniently introducing the bottom sheet 19. In order to secure the correct position of all the columns at the commencement of the booking, the base plate 11 has at 53 a stop, shoulder or the like for the lower account sheet. This stop or shoulder lies in the same plane as a similar stop or shoulder 53a formed on the clamping bar 35. On the other hand the member 25 may be conveniently provided on its underside with suitable means 54 such for example, as a bar, a strip of rubber, a projection or the like which holds the bottom sheet 19 securely and prevents it from shifting when the member 25 is shut down on to the plate 11.

The bar 54, the hinge 50 and the plate 37 which closes the opening 38 may consist of one piece.

For the purpose of determining the daily balance it is intended, by a further development of the invention, to make it possible to keep, in addition to the personal and goods accounts a collective account, which, taking the bookings of the various personal accounts, must be movable simultaneously and uniformly with the particular personal account, but must be capable of being held fixed independently thereof.

This purpose is fulfilled by an arrangement in which, in addition to the device for holding the upper sheet 15, an additional device is provided for holding a collective account sheet in position. In the example illustrated in the drawings there is mounted on the table 36 underneath the bar 35 a second clamping bar 57. A shoulder or stop 57a on the bar 57 is likewise in the same plane with that of the plate 11 and the bar 35 so that the group or collective sheet 58 to be inserted therein (see Fig. 5) lies with the same columns under the sheet 15 in all phases of the bookkeeping operation.

Simple and convenient conditions will be provided in this case if transparent paper be used for the collective sheet 58. It will be sufficient then to insert between the sheets 19 and 58 a double-sided carbon paper 60 which, for instance, adheres to the base plate 11 by means of an adhesive edge 62.

The control for opening and closing of the holding devices 35, 37 can conveniently and practically be carried out by using for this purpose a common operating member such as a lever 65, which, operated in the direction indicated by the arrow in Fig. 2, first opens the bar 35 about the spindle 66 and at a further stage, by pressure on the projection 69, opens the bar 57 about the spindle 70.

As a rule the personal account 15 will be considerably more frequently shifted than the collective account 58. The opening mechanism for the clamping bars will therefore, as can be seen from Fig. 5, be conveniently so arranged that the upper bar 35 opens to a very great angle, for example to a greater angle than the bar 57.

To enable the collective sheet 58 to be more conveniently inserted in the bar 57, the lower half of this bar may be extended beyond the clamping line. Fig. 5 shows this at 72.

The small amount of space necessary for carrying out the bookkeeping operations and the required shifting of the account sheets permits of the apparatus according to this invention being made of a small and handy size, so that the apparatus can be easily used in any desired working place even when the base plate and the sheet holding devices are of a size equal at least to that height necessary to accommodate the maximum line shift of the account sheets without the latter extending beyond the borders of the structure; thus all the sheets have always sufficient support to prevent their becoming creased or torn.

The weight of the apparatus according to this invention is slight, it is cheap to manufacture, and absolutely simple to use. This, together with the use of uniform or stock forms and the possibility of an easily surveyed, effortless division of the bookkeeping operations ensures that the subject matter of the invention permits of rapid, profitable work free from errors not only in the case of small bookkeeping operations but also in many sided businesses.

Having now described our invention, what we claim as new and desire to secure by Letters Patent, is:

1. In an apparatus for loose leaf manifold bookkeeping on superimposed duplicate sheets having debit and credit columns marked thereon, a base plate, a ledge member rockably mounted on one marginal portion of said plate, a holder on said member for the upper sheet, a guide provided in the ledge member for guiding said holder, means for selectively shifting to the right and left the holder for the upper sheet by the width of the debit and credit columns respectively marked on said sheets, and means mounted on said ledge member for holding the lower account sheet down on the base plate.

2. In an apparatus as set forth in claim 1, stop shoulders for the upper and lower sheets provided on said base plate and holder, respectively, and arranged in substantially the same vertical plane for aligning the sheet edges.

3. In an apparatus for loose leaf manifold bookkeeping on superimposed duplicate sheets having debit and credit columns marked thereon, a base plate, a guide mounted on said base plate, a holder on the guide for the upper sheet, a second holder on the guide for fixing an intermediate collective account sheet to receive the entries on the upper sheet in corresponding columns, and means for selective shifting to the right and left said holders in the guide by the width of the debit and credit columns, respectively, marked on the sheets.

4. In an apparatus as set forth in claim 3, a common opening device on the guide for the holders, and means for opening the holders in stages.

5. In an apparatus as set forth in claim 3, clamping bars on the guide for the upper and middle sheets, supports on said bars for bearing said sheets, the support for the clamping bar of the middle sheet having a portion extended beyond the clamping region of the latter bar.

6. In an apparatus for loose leaf manifold bookkeeping on superimposed duplicate sheets having debit and credit columns marked thereon, a base plate, means for holding a lower sheet on said plate, a guide mounted on said plate, a clamping bar for holding the upper of said sheets, a frame movable in the guide and supporting said clamping bar, a rock member connected to the guide for selectively shifting the frame in said guide to a right or left hand position, and stops for automatically limiting said shifting to the width of the debit or credit column, respectively, marked on said sheets.

7. In an apparatus as set forth in claim 6, a slotted arm included in said rock member, and a stud on said frame operatively engaging said slotted arm for moving the frame and rock member concurrently in the same direction in response to the rocking of said member.

FRIDOLIN SEMMLER.
HANS FISCHER.